Dec. 27, 1960
N. C. HUNT ET AL
2,966,168
FLUID VALVE CONTROL
Filed Dec. 27, 1957
2 Sheets-Sheet 1
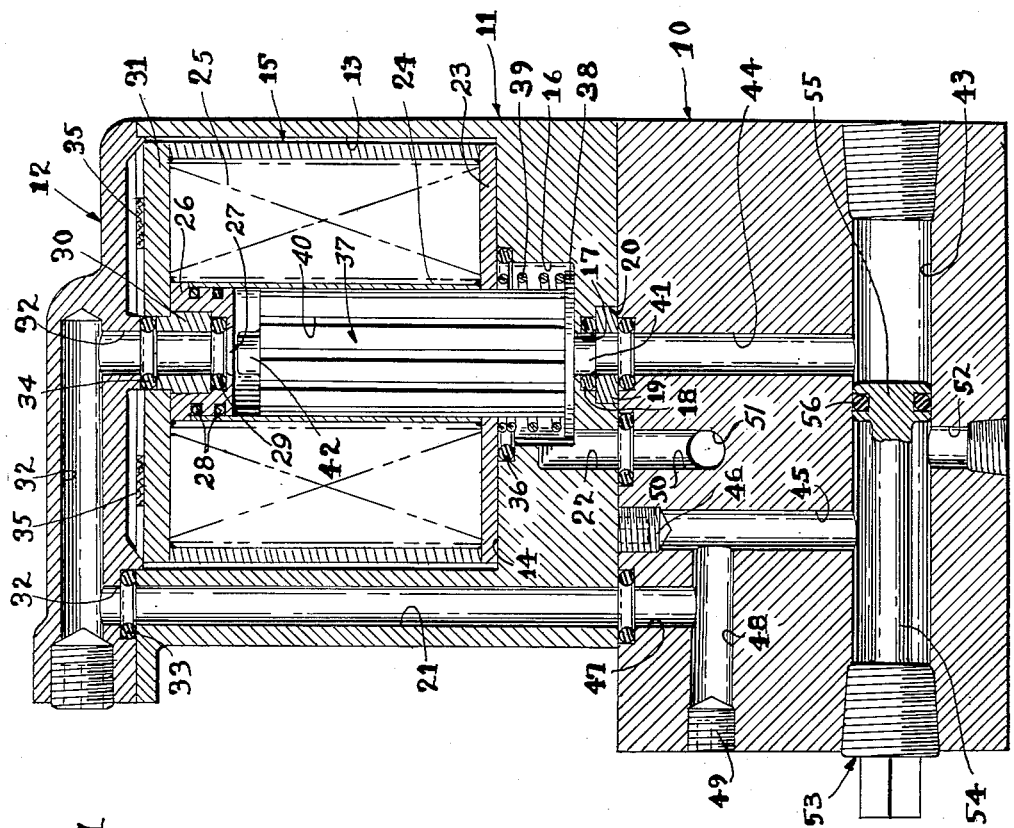
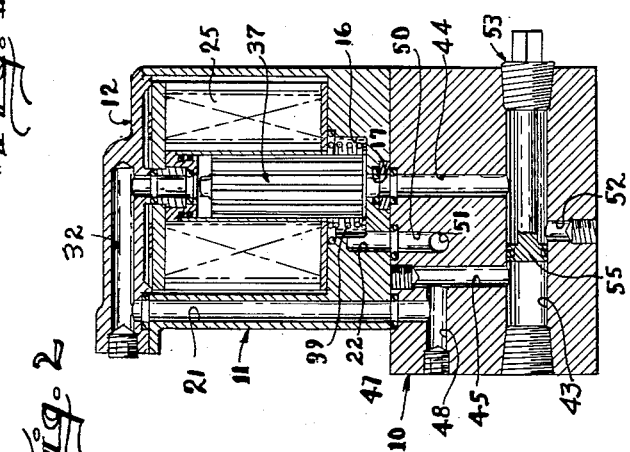
INVENTOR.
Nathan C. Hunt
Kenneth H. Meyer
BY
Attorney

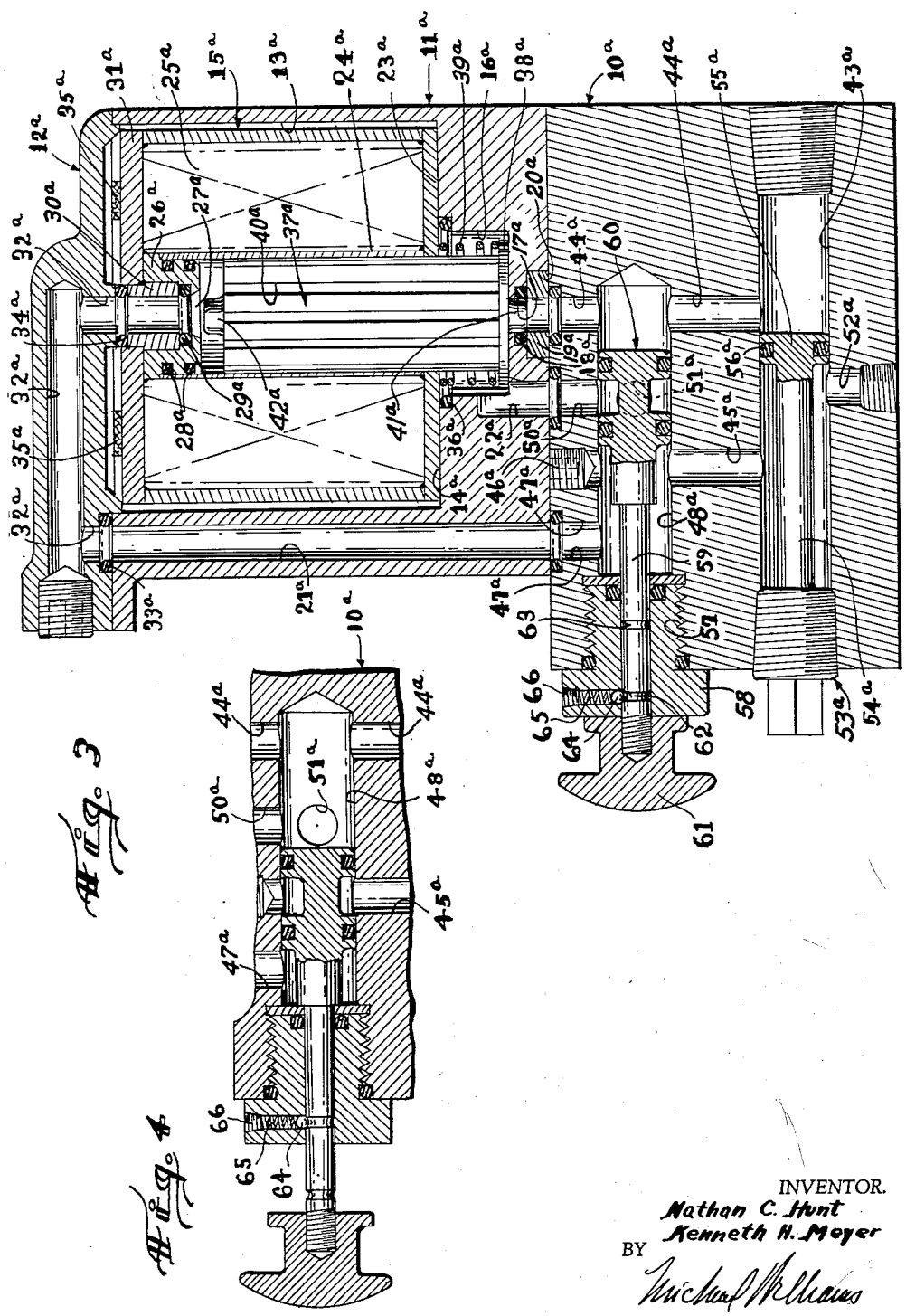

2,966,168

FLUID VALVE CONTROL

Nathan C. Hunt, Miami Beach, Fla., and Kenneth H. Meyer, Salem, Ohio, assignors, by mesne assignments, to International Basic Economy Corporation, New York, N.Y., a corporation of New York Filed Dec. 27, 1957, Ser. No. 705,627

8 Claims. (Cl. 137—270)

The present invention relates to valves for controlling flow of fluid under pressure, more particularly to solenoid operated fluid control valves, and the principal object of the present invention is to provide new and improved valves of such character.

Solenoid operated fluid control valves of the type wherein the movable plunger of the solenoid also functions as a valve member have achieved wide acceptance, especially where compact design is of considerable importance. Prior art valves of this type, however, have a serious disadvantage in that internal restrictions in the valves cause a considerable pressure drop thereacross.

These restrictions are inherent in prior art valves of this type since the effectiveness of their valve port sealing arrangement is directly dependent upon the force exerted by the valve member upon the sealing surfaces. Since the force which can be exerted by a solenoid valve plunger member in this type of valve is rather limited, it is necessary to minimize the area of the sealing surfaces in order to maintain a sufficiently high unit pressure on the sealing surfaces to effectuate a satisfactory seal. This necessity of minimizing the sealing surface area renders obligatory the use of rather small valve ports and this results in the restrictions aforesaid.

The present invention makes it unnecessary to limit the sealing surface area since the pressure of the fluid being sealed contributes to the effectiveness of the seal. Accordingly, the valve ports may be made large enough to minimize internal restrictions to fluid flow therethrough. These and other advantages will readily become apparent from a study of the following description and from the drawings appended hereto.

In the drawings accompanying this specification and forming a part of this application there is shown, for purpose of illustration, embodiments which the invention may assume, and in these drawings:

Figure 1 is a sectional view of a preferred embodiment of a valve constructed in accordance with the present invention, Figure 2 is a reduced size view similar to Figure 1 but illustrating one of the parts thereof in another position, Figure 3 is a view similar to Figure 1 but of another embodiment, and Figure 4 is a fragmentary view of a portion of the valve shown in Figure 3 but with certain parts thereof in another position.

With reference to Figure 1, the valve is herein shown to comprise a lower housing portion 10, an upper housing portion 11, and an upper housing portion cover 12 suitably secured together by any conventional means such as by screws or the like which are omitted from the drawing in the interest of simplicity. Housing portion 10, as will later be described in detail, contains a plurality of fluid passages while housing portion 11 contains the solenoid coil, the solenoid plunger, and other related parts.

As herein disclosed, a recess 13 extends downwardly from the upper surface of housing portion 11 and seated within this recess against the bottom 14 thereof is a solenoid coil assembly 15. Concentric with recess 13 and extending downwardly from the bottom thereof is a smaller recess 16 and concentric with recesses 13, 16 and extending downwardly from the bottom of the latter recess is a still smaller recess 17 which provides a valve port as will appear. As herein shown, disposed within recess 17 and spaced from its mouth for a purpose to appear is a suitable, resilient O sealing ring 18 which is retained in place by means of an apertured retaining member 19 which is seated in a counterbore 20 formed in the lower surface of housing portion 11.

Formed in housing portion 11 to one side of recess 13 is a conduit 21 which extends through the housing portion from its upper to its lower surfaces. Also formed in housing portion 11 is a conduit 22 which extends from the lower surface of the housing portion and terminates in recess 16.

Solenoid coil assembly 15 presently comprises an apertured base plate 23 to which a sleeve 24 is welded, or otherwise secured to provide a leak proof joint, in alignment with the aperture in the base plate. Surrounding sleeve 24 are the windings 25 of an electromagnetic coil. Partially closing the upper end of sleeve 24 is a member 26 having a central recess 27 extending upwardly therethrough which provides another valve port as will appear. Member 26 has a radially extending flange which limits its extension into sleeve 24 and the member carries suitable O rings 28 which effect a fluid-tight seal between the member and the sleeve.

Disposed within recess 27 and spaced from its mouth for a purpose to appear is an O sealing ring 29 which is retained in position by means of a member 30 which fits in a downwardly extending counterbore formed in member 26. Overlying windings 25 of the coil and member 30 is a centrally apertured upper plate 31.

The previously mentioned upper housing portion cover 12 is adapted to close the mouth of recess 13 and has a plurality of conduits 32 which establish communication between conduit 21 in housing portion 11 with recess 27 of member 26. O rings 33, 34 respectively effect sealing between cover 12 and housing 11, and between the cover and member 30.

Means are provided for resiliently forcing the solenoid coil assembly closely against bottom 14 of recess 13 when cover 12 is secured in place and at the present time, a plurality of resilient pads 35 are interposed between the cover 12 and upper plate 31 for this purpose. These pads, being resilient, will absorb the shock which normally takes place upon energization and de-energization of a solenoid. It will be noted that with the coil assembly forced against bottom 14 of recess 13, the latter recess is sealed from recess 16 by means of an O ring 36 which bears against the underside of base plate 23.

Slidably disposed within sleeve 24 is a solenoid plunger 37 which is, of course, formed of magnetic material so that it will be attracted by the electromagnetic coil windings 25 when the latter are energized. Plunger member 37 is of a length to extend beyond the end of sleeve 24 to project into recess 16 and the lower end of the member has a radially extending flange 38. Means are provided for resiliently urging the plunger member to its lowermost position shown in Figure 1 and as herein shown, a helical spring 39 is interposed between flange 38 of the plunger and base plate 23 of the solenoid assembly for this purpose. For reasons to appear, the periphery of the plunger is provided with a plurality of longitudinally extending grooves 40 so that fluid may readily flow about the plunger and through the interior of sleeve 24.

Plunger 37 has a reduced diameter, axially extending lower end portion 41 of a transverse size slightly smaller than valve port recess 17 so as to freely fit therewithin and with the plunger positioned as shown, O ring 18 closely engages the periphery of this end portion and fills the annular space between such end portion and the defining wall of the valve port recess to provide a positive seal which closes this valve port recess. Clearly, when plunger 37 is elevated, as by energization of coil windings 25, portion 41 of the plunger will be withdrawn from valve port recess 17 to permit fluid flow therethrough. Conversely, when windings 25 are de-energized, spring 39 will return the plunger to the position shown wherein plunger portion 41 is within valve port recess 17 to block fluid flow therethrough.

It is to be understood that the relation of parts is such that entrance of plunger portion 41 into O ring 18 will slightly expand the latter into sealing relation with the abutting surfaces between which it is confined. Accordingly, fluid pressure on either side of the O ring will tend to distort it into tighter sealing relation with such abutting surfaces. Since the effectiveness of the seal is not directly dependent upon the force with which the plunger is held against its seat, neither spring 39 nor windings 25 as will later appear need be as strong as those required by prior art constructions. Furthermore, the size of the port need not be limited as was heretofore necessary in order to obtain sufficient unit pressure on the sealing member to insure against leakage. A further advantage of the present construction is that since plunger end 41 has wiping engagement with O ring 18, any foreign material will be wiped from between the sealing surfaces and will not lodge therebetween to cause leakage.

It is to be understood that while in the construction disclosed O ring 18 is carried by housing portion 11 and the plunger end 41 moves toward and away from engagement with the O ring, this O ring could as well be carried by plunger end 41 for movement therewith into and out of sealing relation with the defining wall of valve port recess 17.

The upper end of plunger 37 is formed similar to its lower end in that a portion 42 is provided for entrance into valve port recess 27 and into engagement with O ring 29 to block flow of fluid through this valve port recess when the valve plunger is elevated.

From the foregoing, it will be evident that the interior of sleeve 24 and recess 16 together provide a valve chamber within which a valve member (plunger 37) is reciprocable toward and away from closing relation with spaced-apart valve ports (recesses 17, 27) which, when open, communicate with the valve chamber. It will further be evident that conduit 22 communicates with the valve chamber at a point intermediate the valve port recesses.

Turning now to lower housing portion 10, the latter is formed to provide a transverse conduit 43 extending from one side of the housing to the other. For a purpose to appear, internal screw threads are provided at respective ends of conduit 43. Extending upwardly from conduit 43 is a conduit 44 in alignment with valve port recess 17 and also extending upwardly of conduit 43 and in spaced relation with conduit 44 is a conduit 45 whose upper end is closed by a plug 46. A conduit 47 extends downwardly from the upper surface of housing portion 10 in alignment with conduit 21 of housing portion 11 and a transverse conduit 48, whose end is closed by a plug 49, places conduits 45, 47 in communication with each other.

Extending downwardly from the upper surface of housing portion 10 is a conduit 50 in alignment with conduit 22 formed in housing portion 11 and conduit 50 is intersected by a conduit 51 whose opening is at the rear of housing portion 10. Extending upwardly from the underside of housing portion 10 and intersecting conduit 43 at a place intermediate conduits 44, 45 is a conduit 52 which, as will later appear, is adapted to be connected with a source of fluid pressure. Means are provided for effecting a seal between housing portions 10 and 11 and as herein shown, the upper surface of housing portion 10 is counterbored around each conduit 44, 47 and 50 to receive respective O rings which engage the underside of housing portion 11 and are clamped in place when the housing portions are secured together.

In the position of parts shown in Figure 1, a plug 53 is threaded into and closes the left end of conduit 43 and has an axially extending portion 54 with a radial enlargement 55 which is disposed in conduit 43 intermediate conduits 44, 52. Enlargement 55 is grooved to receive an O ring 56 which sealably engages the wall of conduit 43 and interrupts communication between conduits 44, 52 through conduit 43.

As before mentioned, conduit 52 is adapted to be connected to a suitable source of fluid pressure while conduit 51 is adapted to be connected to a fluid operated device whose control is desired. Although not shown since it forms no part of the present invention, such device may, for example, be a fluid cylinder of any suitable design. The right end of conduit 43 is the exhaust and in the event the present valve is employed to control flow of compressed air, such conduit end may be vented to the atmosphere. If, however, the valve is employed to control flow of hydraulic fluid or other liquid, this end of conduit 43 will be connected to return the exhausted liquid to a suitable reservoir or the like.

With the valve parts arranged as shown in Figure 1, the valve is normally open, that is, inlet fluid will enter conduit 52 and pass out conduit 51 to the controlled device via the left end of conduit 43, conduits 45, 48, 47, 21, 32, valve port recess 27, around plunger 37, through recess 16 and conduits 22, 50. Note that with valve port recess 17 closed, no fluid can flow to exhaust via conduit 44 and the right end of conduit 43.

If windings 25 of the electromagnetic coil are now energized, valve plunger 37 will be elevated from the position shown against the urging of spring 39 so that plunger portion 42 will enter valve port recess 27 to interrupt flow of inlet fluid. Plunger portion 41 will be withdrawn from valve port recess 17 to provide for flow of fluid from the device being controlled to exhaust via conduits 51, 50, 22, through recess 16, valve port recess 17, and through conduit 44 and the right end of conduit 43.

De-energization of windings 25 will, of course, permit spring 39 to return valve plunger 37 to the position shown in Figure 1 wherein valve port recess 27 is open and valve port recess 17 is closed.

It is an important feature of the present invention that the valve may be readily changed from normally open as shown in Figure 1 to normally closed as shown in Figure 2. This may be accomplished merely by removing plug 53 from the left end of conduit 43 and disposing it in the right end of this conduit as illustrated in Figure 2. With the plug thus positioned, enlargement 55 will now interrupt communication between conduits 45, 52 through conduit 43.

With the ports positioned as shown in Figure 2, the device being controlled and still connected to conduit 51 will normally be in communication with exhaust (now the left end of conduit 43) while inlet fluid will enter conduit 52 and pass through the right end of conduit 43 and conduit 44 but will proceed no further since valve port recess 17 is closed.

If windings 25 are now energized to elevate valve plunger 37, conduit 51 to which the device being controlled is connected will be cut off from exhaust and will be placed in communication with inlet fluid via conduits 50, 22, recess 16, through the now open valve port recess 17, through conduit 44, the right end of conduit 43 and conduit 52. De-energization of windings 25 will permit spring 39 to return the valve plunger to the position shown in Figure 2 to block inlet fluid from conduit 51 and to place the latter once again in communication with the left end of conduit 43 so as to exhaust fluid from the device being controlled.

In the modified valve construction shown in Figure 3, means have been provided to permit manual operation of the device being controlled without energizing the solenoid windings and without shifting the valve plunger. In other words, means are provided to cause flow of fluid toward or away from the device being controlled in the same manner as though the coil windings were energized but without shifting the valve plunger. Since the embodiment shown in Figure 3 is similar to that shown in Figure 1, corresponding parts are identified with the same reference characters but with the suffix "a" added.

As herein disclosed, conduit 48a formed in housing portion 10a is enlarged and extends within the housing sufficiently to intersect conduits 50a, 51a and conduit 44a. Internal threads 57 are provided at the outer end of conduit 48a to receive an externally threaded, shouldered sleeve member 58. Extending through the sleeve member 58 is the stem 59 of a valve spool 60 and threaded upon the outer projecting end of stem 59 is an operating knob 61. Spool 60 is proportioned for a sliding fit within conduit 48a and carries suitable O rings which effectuate a seal with the wall of the conduit. Other O rings provide a seal about stem 59 and between sleeve member 58 and housing 10a as will be understood.

Spool 60, in the position of parts shown in Figure 3, is normally adapted to be disposed as illustrated wherein its undercut intermediate portion is aligned with conduits 50a, 51a. This spool, however, is adapted to be shifted by pulling knob 61 out to a position (see Figure 4) wherein its undercut portion is aligned with conduit 45a. Means are provided for holding spool 60 in either of its positions and at the present time, a pair of spaced-apart annular grooves 62, 63 are formed in stem 59. The flanged portion of sleeve member 58 is provided with a transversely extending bore aligned with groove 62 of stem 59 (in the position of parts shown in Figure 3) and disposed in the bore adjacent the stem is a ball 64. A spring 65 resiliently urges the ball to seated relation in groove 62 and a plug 66 keeps the spring and the ball in the bore.

When it is desired to shift spool 60, knob 61 will be pulled to the left with sufficient force to move ball 64 out of groove 62 against the urging of spring 65. When the spool has been moved sufficiently that groove 63 aligns with the ball, spring 65 will urge the latter into this groove to thus resiliently maintain the spool in the position shown in Figure 4. Shifting knob 61 to the right will, of course, return the spool to the position shown in Figure 3.

With the parts positioned as shown in Figure 3, conduit 51a will be in communication with inlet conduit 52a and communication between conduits 51a, 44a will be blocked. Inlet fluid pressure will thus pass to the device connected to conduit 51a in the same manner as heretofore described with respect to Figure 1. Also in a manner similar to Figure 1, energization of the coil windings 25a will shift valve plunger 37a and interrupt communication between conduits 51a, 52a and establish communication between conduits 51a, 44a. This will exhaust the pressure within the device connected to conduit 51a.

When it is desired to control the device connected to conduit 51a without energizing the coil windings, spool 60 will be shifted from the position shown in Figure 3 to the position shown in Figure 4. This will interrupt flow of inlet fluid to conduit 51a and establish communication between the latter and conduit 44a via the right end of conduit 48a. Returning spool 60 to the position shown in Figure 3 will, of course, once again establish flow of inlet fluid to the device connected to conduit 51a.

Since the valve shown in Figure 3 is similar to that shown in Figure 1 in that it contains a plug 53a and its associated parts, the valve shown in Figure 3 may readily be changed from the normally open type illustrated to a normally closed type merely by changing the position of plug 53a. In the event the valve is changed to a normally closed type, spool 60 will function in the same manner as before described; that is, with the spool disposed as shown in Figure 3, operation of the valve will be under control of the solenoid coil. However, shifting the spool to the position shown in Figure 4 will, in such event, interrupt communication between conduit 51a and the exhaust and establish communication between conduit 51a and inlet conduit 52a.

In view of the foregoing it will be apparent to those skilled in the art that we have accomplished at least the principal object of our invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that our invention is not limited thereto.

We claim:

1. A valve for controlling flow of fluid under pressure, comprising a housing providing a valve chamber, a pair of valve ports communicating with said chamber, a pair of valve port conduits within said housing and one end of each terminating at respective valve ports and the other end of each opening outwardly of said housing, an inlet conduit within said housing connectable to a source of fluid pressure, an outlet conduit communicating with said chamber, a valve member disposed within said chamber for movement from a first position wherein it closes one of said valve ports and opens the other for communication with said outlet conduit to a second position wherein it closes said other valve port and opens said one for communication with said outlet conduit, and means for selectively establishing communication between said inlet conduit and one or the other of said valve port conduits while said valve member is disposed in said first position.

2. A valve for controlling flow of fluid under pressure, comprising a housing providing an elongated valve chamber, a pair of valve ports communicating with said chamber, a pair of valve port conduits within said housing and one end of each terminating at respective valve ports and the other end of each terminating in spaced-apart relation in a recess formed in said housing, an inlet conduit within said housing and having one end connectable to a source of fluid pressure and having its other end terminating in said recess in spaced relation with said valve port conduits, an outlet conduit within said housing communicating with said chamber, a magnetic valve member reciprocable within said chamber and biased to a first position wherein it closes one of said valve ports and opens the other for communication with said outlet conduit and shiftable to a second position wherein it closes said other valve port and opens said one for communication with said outlet conduit, an electromagnetic coil encircling said chamber and when energized providing a magnetic field which attracts said valve member and shifts it from said first position to said second position, means for selectively changing flow of fluid through the valve when said valve member is in said first position, in one position said means interrupting communication between said inlet conduit and that valve port conduit which terminates in said one valve port and in another position said means interrupting communication between said inlet conduit and that valve port conduit which terminates in said other valve port and manually operable valve means for selectively establishing communication between said outlet conduit and that valve port conduit which terminates at said one valve port and for interrupting communication between said outlet conduit and that valve port conduit which terminates at said other valve port to effect flow of fluid in said outlet conduit in the same manner as though said coil had been energized but without requiring energization thereof or shifting of said valve member.

3. A valve for controlling flow of fluid under pressure, comprising a housing providing a valve chamber, a pair of valve ports communicating with said chamber, a pair of valve port conduits within said housing and one end of each terminating at respective valve ports and the other end of each terminating in spaced-apart relation in a recess formed in said housing, an inlet conduit within said housing and having one end connectable to a source of fluid pressure and having its other end terminating in said recess in spaced relation with said valve port conduits, an outlet conduit within said housing communicating with said chamber, a valve member shiftable within said chamber and biased to a first position wherein it closes one of said valve ports and opens the other for communication with said outlet conduit and shiftable to a second position wherein it closes said other valve port and opens said one for communication with said inlet conduit, an electromagnetic coil for shifting said valve member from said first position to said second position, means for selectively changing flow of fluid through the valve when said valve member is in said first position, in one position said means interrupting communication between said inlet conduit and that valve port conduit which terminates at said one valve port and in another position said means interrupting communication between said inlet conduit and that valve port conduit which terminates at said other valve port, a shunt conduit within said housing by-passing said one valve port, and manually operable valve means interposed in said shunt conduit and in that valve port conduit which terminates at said other valve port and in one position blocking flow of fluid through said shunt conduit and providing for uninterrupted flow of fluid through the last mentioned valve port conduit, said valve means in another position providing for flow of fluid through said shunt conduit and around said one valve port and simultaneously blocking flow of fluid through that valve port conduit which terminates at said other valve port to provide for flow of fluid in said outlet conduit in the same manner as though said coil had been energized but without requiring energization thereof or shifting said valve member.

4. A valve for controlling flow of pressurized fluid, comprising a valve body providing a valve chamber having a pair of valve ports and said body also having a fluid inlet through which inlet fluid from a suitable source enters the valve, a fluid exhaust through which exhausted fluid exits from the valve, and a fluid outlet through which fluid flows from said fluid inlet to a fluid actuated device and through which fluid flows from such device to said fluid exhaust, conduit means within said valve body establishing communication between said fluid inlet and one of said valve ports and between said fluid exhaust and the other of said valve ports, a valve member disposed within said valve chamber for movement from a first position wherein one of said valve ports is open and the other is closed to a second position wherein said one valve port is closed and said other is open, and means for selectively changing flow of fluid through the valve when said valve member is in said one position, said means in a first position establishing communication between said fluid inlet and said one valve port and between said fluid exhaust and said other valve port and in a second position establishing communication between said fluid inlet and said other valve port and between said fluid exhaust and said one valve port.

5. A valve for controlling flow of fluid under pressure, comprising a housing providing a valve chamber, a pair of valve ports communicating with said chamber, a pair of valve port conduits within said housing and one end of each terminating at respective valve ports and the other end of each terminating in a recess formed in said housing, an inlet conduit within said housing and having one end connectable to a source of fluid pressure and having its other end terminating in said recess, an outlet conduit communicating with said chamber, a valve member disposed within said chamber for movement from a first position wherein it closes one of said valve ports and opens the other for communication with said outlet conduit to a second position wherein it closes said other valve port and opens said one for communication with said outlet conduit, and means within said recess for selectively changing flow of fluid through the valve when said valve member is in said first position, in one position said means interrupting communication between said inlet conduit and that valve port conduit which terminates at said one valve port and in another position said means interrupting communication between said inlet conduit and that valve port conduit which terminates at said other valve port.

6. A valve for controlling flow for fluid under pressure, comprising a housing providing an elongated valve chamber, a pair of valve ports communicating with respective axially spaced portions of said chamber, a pair of valve port conduits within said housing and one end of each terminating at respective valve ports and the other end of each terminating in spaced-apart relation in a recess formed in said housing, an inlet conduit within said housing and having one end connectable to a source of fluid pressure and having its other end terminating in said recess in spaced relation with said valve port conduits, an outlet conduit within said housing communicating with said chamber intermediate said valve ports, a magnetic valve member reciprocable within said chamber and biased to a first position wherein it closes one of said valve ports and opens the other for communication with said outlet conduit and shiftable to a second position wherein it closes said other valve port and opens said one for communication with said outlet conduit, an electro-magnetic coil encircling said chamber and when energized providing a magnetic field which attracts said valve member and shifts it from said first position to said second position, and means within said recess for selectively changing flow of fluid through the valve when said valve member is in said first position, in one position said means interrupting communication between said inlet conduit and that valve port conduit which terminates at said one valve port and in another position said means interrupting communication between said inlet conduit and that valve port conduit which terminates at said other valve port.

7. A valve for controlling flow of pressurized fluid comprising a valve body having a fluid inlet through which inlet fluid from a suitable source enters the valve, a fluid exhaust through which exhausted fluid exits from the valve, and a fluid outlet through which fluid flows from said fluid inlet to a fluid actuated device and through which fluid flows from such device to said fluid exhaust, said valve body also providing a valve chamber having a pair of valve ports one of which is in communication with said fluid exhaust, a valve member disposed within said valve chamber for movement from a first position wherein one of said valve ports is open and the other is closed to a second position wherein said one valve port is closed and the other is open, and means for selectively changing flow of fluid through the valve when said valve member is in said one position, in one position said means establishing communication between said fluid inlet and one of said valve ports and between said fluid exhaust and said other valve port and in another position said means establishing communication between said fluid inlet and said other valve port and between said fluid exhaust and said one valve port.

8. A valve for controlling flow of pressurized fluid comprising a valve body formed of first and second body parts removably secured together and having a fluid inlet through which inlet fluid from a suitable source enters the valve, a fluid exhaust through which exhausted fluid exits from the valve, and a fluid outlet through which fluid flows from said fluid inlet to a fluid actuated device and through which fluid flows from such device to said fluid exhaust, said first valve body part providing a valve chamber having a pair of valve ports one of which is in communication with said fluid inlet and the other of which is in communication with said fluid exhaust, a valve member disposed within said valve chamber for movement from a first position wherein one of said valve ports is open and the other is closed to a second position wherein said one valve port is closed and the other is open, and means carried by said second valve body part for selectively changing flow of fluid through the valve when said valve member is in said second position, in one position said means establishing communication between said fluid inlet and one of said valve ports and between said fluid exhaust and said other valve port and in another position said means establishing communication between said fluid inlet and said other valve port and between said fluid exhaust and said one valve port.

References Cited in the file of this patent
UNITED STATES PATENTS

| | | |
|---|---|---|
| 1,616,706 | Taber et al. | Feb. 8, 1927 |
| 2,296,266 | Breckenridge | Sept. 22, 1942 |
| 2,485,504 | Morgan | Oct. 18, 1949 |
| 2,638,108 | Williams | May 12, 1953 |
| 2,830,743 | Rimsha et al. | Apr. 15, 1958 |
| 2,861,592 | Collins | Nov. 25, 1958 |